US011223668B2

United States Patent
Fu et al.

(10) Patent No.: US 11,223,668 B2
(45) Date of Patent: Jan. 11, 2022

(54) ANOMALY DETECTION OF MEDIA EVENT SEQUENCES

(71) Applicant: Telefonaktiebolaget LM Ericsson (publ), Stockholm (SE)

(72) Inventors: Jing Fu, Solna (SE); Xiaoyu Lan, Täby (SE); Liyi Meng, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 192 days.

(21) Appl. No.: 16/473,144

(22) PCT Filed: Jan. 12, 2017

(86) PCT No.: PCT/EP2017/050573
§ 371 (c)(1),
(2) Date: Jun. 24, 2019

(87) PCT Pub. No.: WO2018/130284
PCT Pub. Date: Jul. 19, 2018

(65) Prior Publication Data
US 2019/0364088 A1    Nov. 28, 2019

(51) Int. Cl.
*G06F 15/16* (2006.01)
*H04L 29/06* (2006.01)
(Continued)

(52) U.S. Cl.
CPC ............ *H04L 65/80* (2013.01); *G06F 16/435* (2019.01); *H04L 43/067* (2013.01); *H04L 43/08* (2013.01); *H04L 43/16* (2013.01)

(58) Field of Classification Search
CPC ....... H04L 65/80; H04L 43/067; H04L 43/08; H04L 43/16; G06F 16/435
(Continued)

(56) References Cited

U.S. PATENT DOCUMENTS

| 7,519,860 B2 * | 4/2009 | Hatonen | ................ G06N 3/08 714/26 |
| 8,126,833 B2 | 2/2012 | Cobb et al. | |

(Continued)

OTHER PUBLICATIONS

International Search Report and Written Opinion dated May 26, 2017 for International Application No. PCT/EP2017/050573 filed on Jan. 12, 2017, consisting of 9-pages.
(Continued)

*Primary Examiner* — Thu Ha T Nguyen
(74) *Attorney, Agent, or Firm* — Christopher & Weisberg, P.A.

(57) ABSTRACT

A method and detector for detecting anomalies among media event sequences are disclosed. One method includes obtaining a first profile of media event data over a first time period, where the first profile is a first distribution of different media event sequences. Each sequence is associated with a number of occurrences of the sequence and the first profile having a first profile vector. The method further includes obtaining a second profile of media event data over a second time period less than the first time period. The second profile is a second distribution of the different media sequences and the second profile having a second profile vector. The method also includes comparing the first profile vector and the second profile vector, and determining one of a presence and absence of at least one anomaly in the second profile vector of media event data based on the comparison.

12 Claims, 6 Drawing Sheets

(51) Int. Cl.
  *G06F 16/435* (2019.01)
  *H04L 12/26* (2006.01)
(58) Field of Classification Search
  USPC .......................................... 709/219, 223, 224
  See application file for complete search history.

(56) References Cited

U.S. PATENT DOCUMENTS

| | | | |
|---|---|---|---|
| 8,670,983 B2 | 3/2014 | Garland et al. | |
| 8,856,598 B1* | 10/2014 | Madahar | G06F 11/0709 |
| | | | 714/47.2 |
| 9,961,571 B2* | 5/2018 | Yang | H04W 24/04 |
| 10,574,512 B1* | 2/2020 | Mermoud | H04L 41/0636 |
| 2006/0150216 A1* | 7/2006 | Herz | H04H 60/46 |
| | | | 725/50 |
| 2007/0250292 A1* | 10/2007 | Alagappan | C10B 55/00 |
| | | | 702/184 |
| 2008/0180084 A1* | 7/2008 | Dougherty | G11B 20/1816 |
| | | | 324/72 |
| 2011/0125763 A1 | 6/2011 | Takanen et al. | |
| 2013/0340076 A1* | 12/2013 | Cecchetti | G06F 21/6218 |
| | | | 726/23 |
| 2016/0147752 A1* | 5/2016 | Manning | G06F 16/4387 |
| | | | 715/738 |
| 2018/0032862 A1* | 2/2018 | Oliner | G06N 3/0445 |
| 2018/0081914 A1* | 3/2018 | Zoll | G06F 11/3452 |
| 2018/0091649 A1* | 3/2018 | Cao | G06F 7/556 |
| 2018/0174188 A1* | 6/2018 | Wilkinson | G06Q 30/0261 |
| 2018/0300788 A1* | 10/2018 | Mattingly | G06Q 30/016 |
| 2018/0341706 A1* | 11/2018 | Agrawal | G06K 9/00758 |
| 2018/0356151 A1* | 12/2018 | Suraganda Narayana | |
| | | | G05B 23/0283 |
| 2019/0057197 A1* | 2/2019 | Wang | G06F 16/958 |
| 2019/0334784 A1* | 10/2019 | Kvernvik | H04W 24/08 |
| 2019/0364088 A1* | 11/2019 | Fu | H04L 43/08 |
| 2019/0394080 A1* | 12/2019 | Malboubi | H04L 41/0613 |
| 2020/0059800 A1* | 2/2020 | Menon | H04L 41/0654 |
| 2020/0104731 A1* | 4/2020 | Oliner | G06F 16/245 |
| 2020/0320414 A1* | 10/2020 | Neumann | G06K 9/6282 |
| 2020/0322868 A1* | 10/2020 | Claffey | H04W 40/02 |
| 2020/0349430 A1* | 11/2020 | Schmidtler | G06N 3/08 |
| 2020/0382361 A1* | 12/2020 | Chandrasekhar | G06N 20/00 |
| 2020/0387797 A1* | 12/2020 | Ryan | G06N 3/088 |
| 2020/0393810 A1* | 12/2020 | Kempf | G05B 23/0267 |
| 2020/0396147 A1* | 12/2020 | Han | H04L 41/0622 |
| 2021/0026723 A1* | 1/2021 | Nadger | G06F 11/0778 |
| 2021/0026724 A1* | 1/2021 | Nadger | G06F 11/0709 |
| 2021/0034581 A1* | 2/2021 | Boven | G06F 9/541 |
| 2021/0093734 A1* | 4/2021 | Wilson | A61K 48/0075 |
| 2021/0117232 A1* | 4/2021 | Sriharsha | G06F 9/3891 |
| 2021/0117868 A1* | 4/2021 | Sriharsha | G06F 17/18 |
| 2021/0133670 A1* | 5/2021 | Cella | H04L 9/3239 |
| 2021/0157312 A1* | 5/2021 | Celia | G05B 13/028 |
| 2021/0182996 A1* | 6/2021 | Cella | G06Q 10/0834 |

OTHER PUBLICATIONS

Chandola et al. "Anomaly Detection: A Survey"; University of Minnesota; ACM Computing Surveys, vol. 41, No. 3, Article 15, Publication date: Jul. 2009, consisting of 58-pages.

* cited by examiner

ANOMALY DETECTION OF MEDIA EVENT SEQUENCES

CROSS-REFERENCE TO RELATED APPLICATIONS

This application is a Submission Under 35 U.S.C. § 371 for U.S. National Stage Patent Application of International Application Number: PCT/EP2017/050573, filed Jan. 12, 2017 entitled "ANOMALY DETECTION OF MEDIA EVENT SEQUENCES," the entirety of which is incorporated herein by reference.

TECHNICAL FIELD

The present disclosure relates to data communications and in particular to anomaly detection of media event sequences in a communication system.

BACKGROUND

Media clients downloading media such as videos from a media server in the "cloud", i.e., the Internet, and playing the media on personal devices such as mobile phones, laptops, iPads, etc., have increased dramatically in recent years. Players and applications playing media downloaded from a media server may report, i.e., feedback, events and characteristics of a media play session to the media server such as video start, video end, buffering start, buffering end, etc. From this reporting, the media server may obtain key performance indicators (KPIs) such as the number of users playing a particular media segment.

FIG. 1 is a diagram of a communication system 10 that includes a plurality of media players 12 connected to a media server 14 via a communications cloud 16 such as the Internet that may include the Internet. The media server 14 provides media streams to the media players 12 and captures media events feedback from the media players 12 via a media capture unit 18. Media events include media started, media ended, buffering started, buffering ended, paused, bit-rate switched, etc. These events are utilized to obtain the KPIs via a KPI unit 20.

A time series analysis unit 22 can be applied to detect anomalies in the KPIs. The general approach is to analyze how different KPIs vary in time, and indicate an anomaly when a KPI is outside of its normal range. This approach assumes that there are considerably more normal observations than abnormal operations (anomalies) in the observed data. To implement this approach, a profile of normal behavior is obtained. Such a profile can include patterns, distributions or summary statistics for an overall population of users. Anomalies are observations whose characteristics differ from the normal profile by more than a predetermined threshold amount.

Several known anomaly detection techniques exist, including a classification based approach. In the classification based approach a classification model for normal and anomalous events are built based on labeled training data and the model is used to classify new samples. In a rule based approach, specific rules are derived based on domain knowledge to detect anomalies. In a statistical based approach, a statistical test that depends on a distribution of data is applied. A KPI value has a mean and a variance and samples are detected that deviate from the norm. In a clustering based approach, a clustering algorithm that utilizes a notion of outliers is applied to samples to determine samples far from a cluster centroid. Samples far from the cluster centroid are considered to be anomalies. In a distance based approach, data is represented as a vector of features, the distance between samples is computed and samples far away from a nearest neighbor is considered to be anomalous.

One approach involves treating each media event as a KPI and monitoring these events individually. This approach is problematic for several reasons. First, monitoring KPIs individually does not account for relationships between KPIs. For example, even when two KPIs are in their normal range, their ratio, which goes undetected, may not be normal. By way of explanation of this situation, suppose the number of buffer started events reaches the upper limit while the number of video started events is at the low limit of the normal range. The percentage of buffer started events compared with video started event could exceed the normal range due to bad network quality. This anomaly won't be detected by monitoring those two KPIs individually. Second, monitoring of individual KPIs may trigger alarms which are not directly system related. For example, when the number of video users or the video started events grow significantly for a time period, this could be a result of user behavior, for example, during world cup football, while the system functions normally. Thus, the number of video start events would indicate a problem when there is no problem.

SUMMARY

Some embodiments advantageously provide a method, an anomaly detector and a computer program for detecting anomalies among media event sequences. According to one aspect, a method includes obtaining a first profile of media event data over a first time period, where the first profile of media event data is a first distribution of different media event sequences. Each sequence is associated with a number of occurrences of the sequence and the first profile having a first profile vector. The method further includes obtaining a second profile of media event data over a second time period less than the first time period. The second profile of media event data is a second distribution of the different media event sequences and the second profile having a second profile vector. The method also includes comparing the first profile vector and the second profile vector, and determining one of a presence and absence of at least one anomaly in the second profile vector of media event data based on the comparison.

According to this aspect, in some embodiments, the comparing includes computing a scalar product of the first profile vector and the second profile vector. In some embodiments, a media event of the media event data of the first profile vector includes at least one of a buffer start event, a media start event and a bit-rate switch event. In some embodiments, the first time period is at least a month and the second time period is at least an hour. In some embodiments, the comparing is by a cosine similarity function. In some embodiments, the comparing is by a cosine similarity function and the method further includes storing the cosine similarity function as a function of time of occurrence of events to determine a time of occurrence of the anomaly. In some embodiments, the method further includes comparing the function of time of the cosine similarity function to a function of key performance indicators, KPIs, versus time to ascertain a cause of the anomaly. In some embodiments, an anomaly is determined to exist when the cosine similarity function drops below a predetermined threshold.

According to another aspect, an anomaly detector for detecting anomalies among media event sequences is provided. the anomaly detector includes processing circuitry including a memory and a processor. The memory is configured to store a first vector of media event data and a second vector of media event data. The processor is configured to: obtain a first profile of media event data over a first time period, the first profile of media event data being a first distribution of different media event sequences, each sequence being associated with a number of occurrences of the sequence, the first profile having a first profile vector. The processor is also configured to: obtain a second profile of media event data over a second time period less than the first time period, the second profile of media event data being a second distribution of the different media sequences, the second profile having a second profile vector. The processor is also configured to compare the first profile vector and the second profile vector, and determine one of a presence and absence of at least one anomaly in the second profile of media event data based on the comparison.

According to this aspect, in some embodiments, the comparing includes computing a scalar product of the first profile vector and the second profile vector. In some embodiments, a media event of the media event data of the first profile vector includes at least one of a buffer start event, a media start evet and a bit-rate switch event. In some embodiments, the first time period is at least a month and the second time period is at least an hour. In some embodiments, the comparing is by a cosine similarity function. In some embodiments, the comparing is by a cosine similarity function and the memory is further configured to store the cosine similarity function as a function of time of occurrence of events to determine a time of occurrence of the anomaly. In some embodiments, the processor is further configured to compare the function of time of the cosine similarity function to a function of key performance indicators, KPIs, versus time to ascertain a cause of the anomaly. In some embodiments, an anomaly is determined to exist when the cosine similarity function drops below a predetermined threshold.

According to yet another aspect, an anomaly detector for detecting anomalies among media event sequences is provided. A first profile module is configured to obtain a first profile of media event data over a first time period. The first profile of media event data is a first distribution of different media event sequences, each sequence being associated with a number of occurrences of the sequence. The first profile has a first profile vector. A second profile module is configured to obtain a second profile of media event data over a second time period less than the first time period. The second profile of media event data is a second distribution of the different media sequences and the second profile has a second profile vector. A comparison module is configured to compare the first profile vector and the second profile vector; and an anomaly determination module is configured to determine one of a presence and absence of at least one anomaly in the second profile vector of media event data based on the comparison.

According to this aspect, in some embodiments, the comparing includes computing a scalar product of the first profile vector and the second profile vector. In some embodiments, the comparing is by a cosine similarity function and the memory is further configured to store the cosine similarity function as a function of time of occurrence of events to determine a time of occurrence of the anomaly. In some embodiments, a root cause determiner is configured to compare the function of time of the cosine similarity function to a function of key performance indicators, KPIs, versus time to ascertain a cause of the anomaly.

According to yet another aspect, a computer program product is stored on a non-transitory medium. The computer program product is configured to detect anomalies among media event sequences. In one embodiment, the computer program product has instructions that when executed by a processor cause the processor to perform the process steps of obtain a first profile of media event data over a first time period, obtain a second profile of media event data over a second time period less than the first time period, compare the first profile vector and the second profile vector, and determine one of a presence and absence of at least one anomaly in the second profile vector of media event data based on the comparison.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
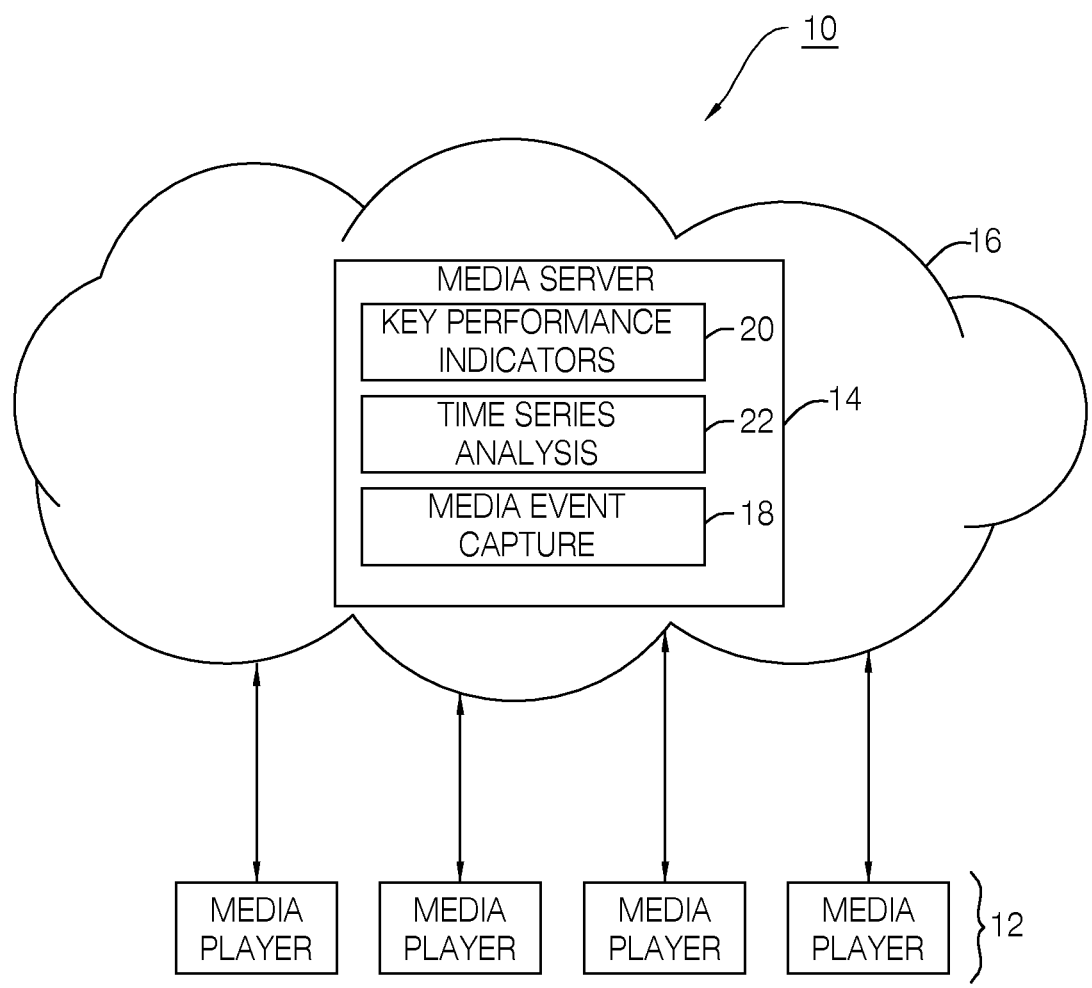
FIG. 1 is a diagram of a known network having a media server and media players.

Before describing in detail exemplary embodiments, it is noted that the embodiments reside primarily in combinations of apparatus components and processing steps related to anomaly detection of media event sequences in a communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, a machine learning approach to detect anomalies among media event sequence data is provided. Based on raw media event data, a media event sequence can be constructed for each media session based on the time of the events. Next, the system can create a profile of event sequences for a whole network. For example, a distribution of different event sequence types can be constructed. Thereafter, the profile of the event sequences can be used to detect anomalies by comparing similarities of distribution of event sequences.

Figure 2:
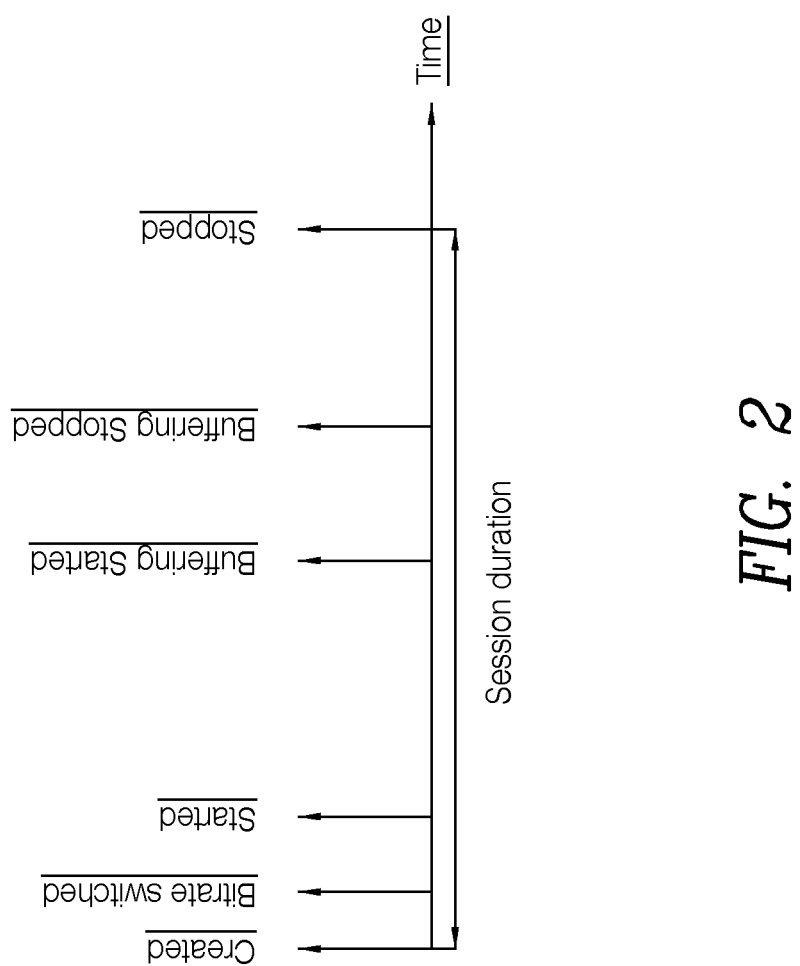
FIG. 2 is a diagram of an example of a media event sequence.

An example of an event sequence for a session duration for a single media player 12 is shown in FIG. 2. Other media events include paused, resumed, scrubbed and error occurred, client/roll. Other sequences may arise while monitoring media events from media players. The frequency of occurrence of each sequence over a long period of time, for example, a month, can be tabulated as shown for a few example sequences in Table 1.

TABLE 1

| Attribute (Event sequence) | Value |
|---|---|
| [created; client/roll; client/unroll; connectivity_changed; bitrate_switched; started] | 171667 |
| [created, client/roll, scrubbed, buffering_started, scrubbed, paused, buffering_stopped] | 4374 |
| [created, bitrate_switched, paused, started, bitrate_switched] | 16995 | where the values are number of occurrences. These numbers are examples, only. In an actual system, the number of occurrences will likely differ from those shown in the example table. The profile of media events accumulated over a long period of time is referred to herein as a normal profile and the period of time over which the profile is obtained is referred to as the normal time interval.

In one embodiment, a cosine similarity function is used as a measure of similarity of the normal profile and subset profiles taken over shorter period of times to detect anomalies among a set of acquired media event data. The cosine similarity function is an inner product of two vectors a and b and is given by:

$$\text{similarity}\_(a, b) = \cos(a, b) = \frac{a \cdot b}{|a||b|} = \frac{\sum a_b b_b}{\sqrt{\sum a_i^2} \sqrt{\sum b_i^2}}$$

Using the above equation, one of the two vectors is the normal profile and the other of the two vectors is a subset profile. The smaller the angle between the two vectors, indicating closer similarity between the two vectors, the closer the cosine similarity function is to unity. The greater the angle between the two vectors, indicating greater dissimilarity between the two vectors, the closer the cosine similarity function is to zero. Thus, the cosine similarity function provides a measure of similarity between the two vectors. When the normal profile and the subset profile differ greatly, indicating a possible anomaly, the cosine similarity function approaches zero. When the subset profile is proportional to the normal profile, indicating no anomaly, the cosine similarity function approaches unity.

To use this function, each target event sequence is associated with a number of occurrences during the time period over which data is observed. Thus, the normal profile has the first vector, a, and the target profile has the second vector, b. The normal time period may be a month, for example, and the target profile can be constructed hourly or daily, for example. The similarity function is applied to each target profile whose anomalies, if any, are to be determined. An example of the cosine similarity function applied to the normal profile and two target profiles is in Table 2.

TABLE 2

| | Started, stopped | Started, buffering_started, buffering_ended, stopped | Start, bitrate_switched, stopped | Cosine similarity to the main profile |
|---|---|---|---|---|
| Profile all | 10000 | 20000 | 50000 | 1 |
| Profile 1 | 1000 | 2000 | 5000 | 1 |
| Profile 2 | 1000 | 3000 | 4000 | 0.97 |

As can be seen in Table 2, the cosine similarity function applied to a profile taken over a duration of the normal profile (Profile All) is 1. The cosine similarity function applied to a subset profile, Profile 1, is also 1, since the normal profile is an integer multiple of the profile 1. The cosine similarity function applied to the subset profile, Profile 2, is less than unity since the normal profile is not simply an integer multiple of the profile 2. This indicates a possible anomaly.

Figure 3:
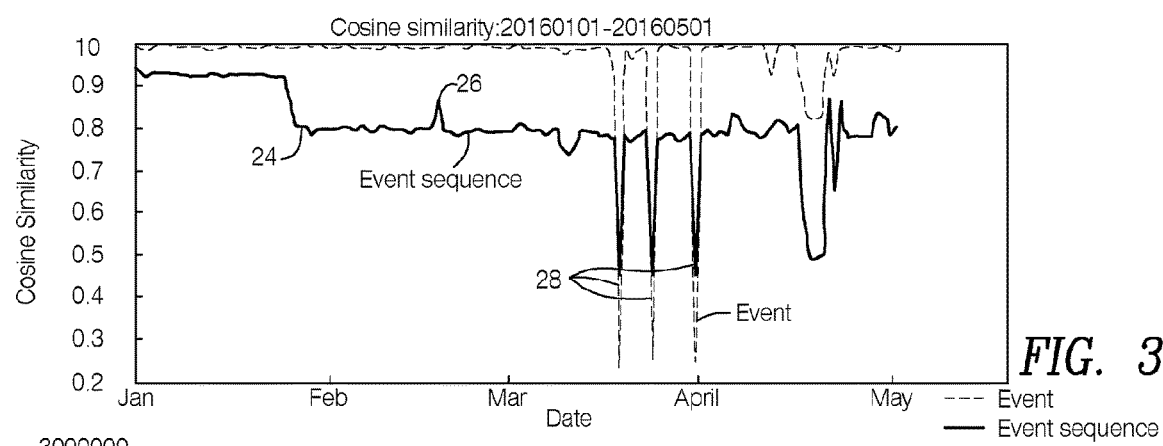
FIG. 3 is graph of a cosine similarity curve.
Figure 4:
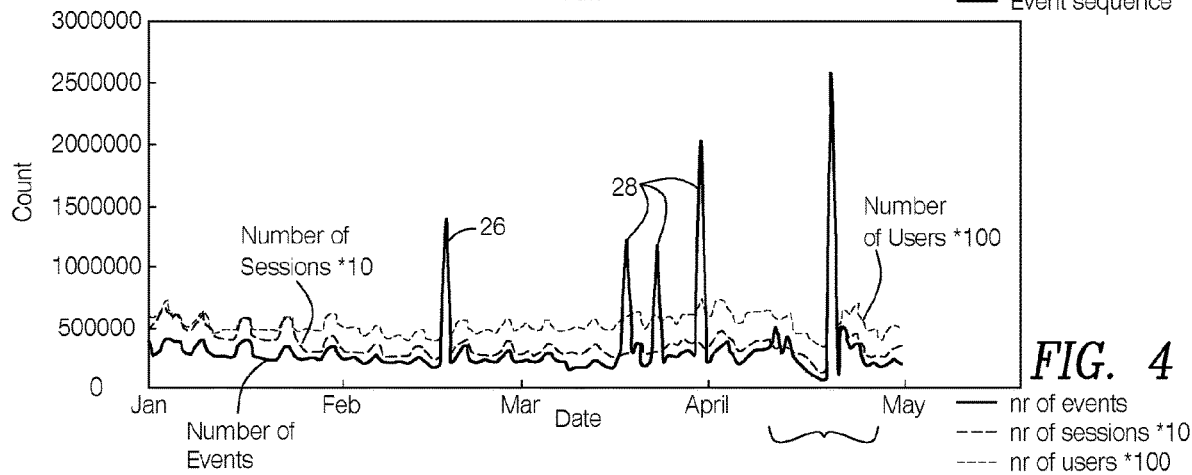
FIG. 4 is a graph of a KPI time series analysis.

The example of FIG. 3 is a graph of the cosine similarity function plotted as a function of time over a period of five months for a representative system. To create the graph, daily or hourly profiles of media event data are obtained by observing captured events over a relevant time frame. Then, these profiles are compared to the normal profile using the cosine similarity function to obtain a similarity measure. The results may be shown as a function of time, as shown in FIG. 3. In comparison, FIG. 4 is a graph of three different KPIs as a function of time over the same period as shown in FIG. 3. The three different KPIs are number of events, number of sessions times 10 and number of users times 100. One can compare these two graphs to learn about potential causes of anomalies such as bad network quality, change of user behavior, upgrade of applications, system error, etc. Examples of such comparison are provided below.

For example, according to FIG. 3, on January $22^{nd}$ there is an obvious decrease of cosine similarity value at 24. This anomaly is caused by upgrading of applications and is not captured by the KPI series of FIG. 4. On February $18^{th}$ there is a slight peak 26 that occurs in the similarity plot of FIG. 3 and a corresponding peak 26 in the KPI series of FIG. 4. After performing root cause analysis, one may find that the peak is caused by an increasing number of users for a big media event, such as a football game, which is not a real anomaly. Using this same example, one may find this by correlating the peak with what was programmed to be televised at the time of the event. As a number of events increases, the cosine similarity value of profiles increases with more data, meaning that a big media event is less likely to be indicated as an anomaly. On March $18^{th}$, $23^{rd}$, and $30^{th}$, anomalies 28 are captured by both the cosine similarity function and by the KPI time series. Thus, the cosine similarity chart reveals at least as much information as the KPI time series. These abnormalities are cause by a big increase in client/roll events. A client/roll event is an event associated with a media client trying to connect to a media server. In some embodiments, if there is a big increase in client/roll events, which means clients are trying, but fail, to connect to the server, bad network quality is a possible cause. Further peaks on April $16^{th}$, $17^{th}$ and $18^{th}$ are also observed which may be indicative of system errors. Thus, embodiments of the anomaly detector that employ the cosine similarity function may be used to detect anomalies and system events that are not detected by a KPI series.

Figure 5:
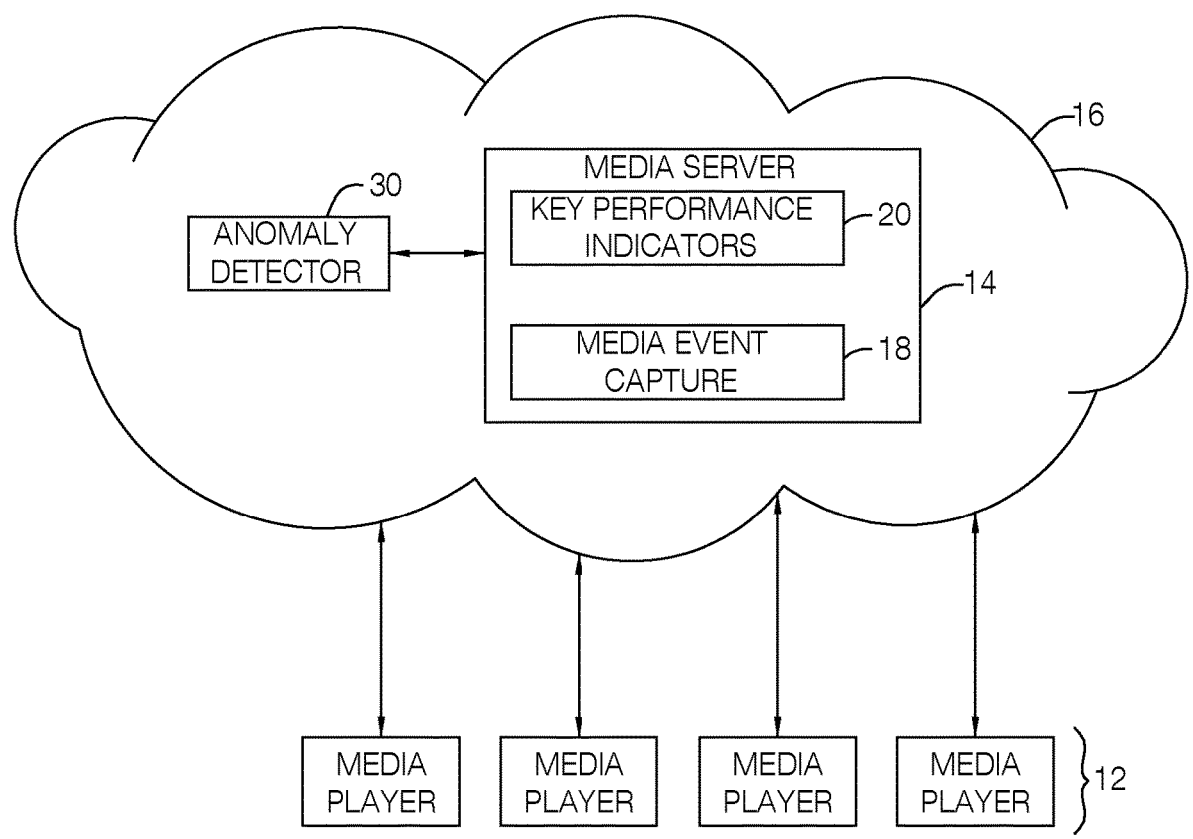
FIG. 5 is a diagram of a network having a media server, media players and an anomaly detector constructed as described herein.

FIG. 5 is a block diagram of an embodiment of media server 14 in communication with an anomaly detector 30 that performs the profile comparison described above to detect anomalies and system events based on application of the cosine similarity function. The anomaly detector 30 may be separate from the media server 14 and may be in communication with one or more media servers 14, performing anomaly detection and detection of system events for each of the media servers 14.

In some embodiments, the media event capture device 18 continuously, periodically or in response to a query from the anomaly detector 30, sends event indications to the anomaly detector 30. These event indications may be, for example, an indication of a started event or a bitrate switched event, a stopped event, etc. From this information, the anomaly detector 30 may form media event data vectors which are compared with a profile by a cosine similarity function as described above. The result of the cosine similarity function per event sequence is a value between unity and zero that varies with time. The result may be returned to the media server 14 or to another node accessible by an operator who may then perform root cause analysis to determine a cause for any apparent anomalies indicated by the results. Alternatively, in some embodiments, the anomaly detector 30 may be incorporated within a media server 14.

Figure 6:
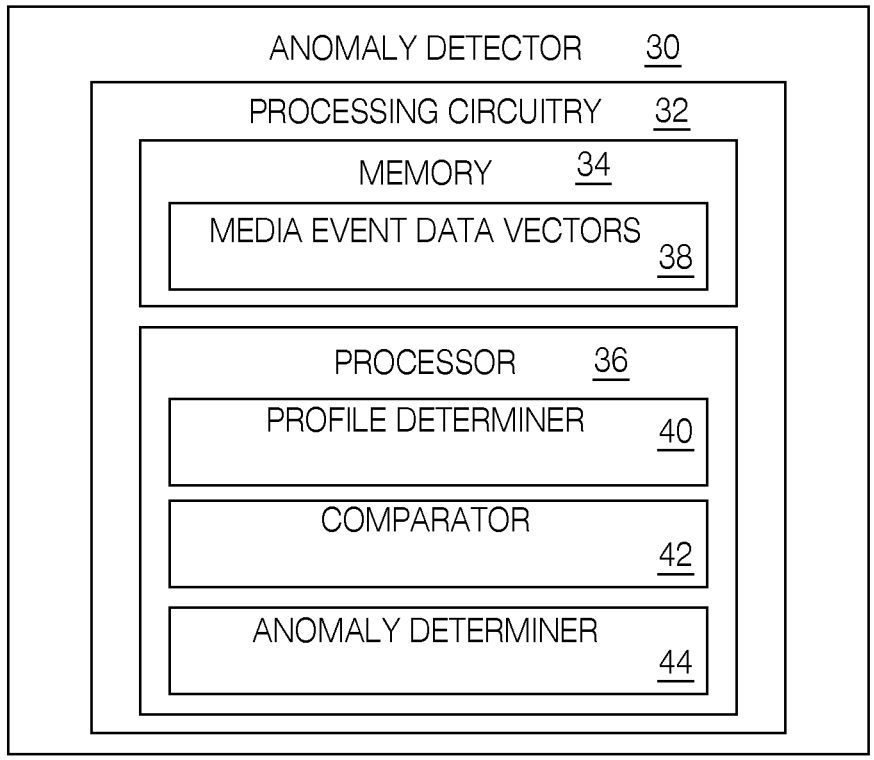
FIG. 6 is a block diagram of an anomaly detector for detecting anomalies among media event sequences.

FIG. 6 is a block diagram of the anomaly detector 30 that has processing circuitry 32. In some embodiments, the processing circuitry may include a memory 34 and processor 36, the memory 34 containing instructions which, when executed by the processor 36, configure processor 36 to perform the one or more functions described herein. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry).

Processing circuitry 32 may comprise and/or be connected to and/or be configured for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry and/or other data, e.g., data pertaining to communication, e.g., configuration and/or address data of nodes, etc. Processing circuitry 32 may be configured to control any of the methods described herein and/or to cause such methods to be performed, e.g., by processor 36. Corresponding instructions may be stored in the memory 34, which may be readable and/or readably connected to the processing circuitry 32. In other words, processing circuitry 32 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be configured to be accessible for reading and/or writing by the controller and/or processing circuitry 32.

For example, in one embodiment, the memory 32 is configured to store media event data vectors 38. The processor 36 is configured to implement a profile determiner 40. The profile determiner 40 obtains a first profile of media event data over a first time period. The first profile of media event data is a first distribution of different media event sequences, each sequence being associated with a number of occurrences of the sequence. The first profile has a first profile vector. The first time period is a long time period, for example, a month. The first profile vector thus corresponds to the normal profile vector.

The profile determiner 40 also obtains a second profile of media event data over a second period of time less than the first period of time. For example, the second period of time may be hourly or daily. The second profile of media event data is a second distribution of the different media sequences and has a second profile vector. Thus, the second profile corresponds to the target profile.

The processor 36 also implements a comparator 42 configured to compare the first profile vector and the second profile vector. In some embodiments, the comparator 42 implements the cosine similarity function described above by forming the scalar product of the first and second profile vector. Based on the comparison performed by the comparator 42, an anomaly determiner 44 determines the presence or absence of at least one anomaly. The presence or absence of an anomaly may be determined by performing a root cause analysis. Note that in some embodiments, the comparator 42 performs a scalar product of the first and second profile vectors. In some embodiments the scalar product is related to an angle between the first and second profile vectors, as in the cosine similarity function set forth above. Note that in some embodiments, components for implementing the functionality of the anomaly detector 30 may be distributed among various nodes in the cloud 16. In other words, the anomaly detector 30 need not be formed by a single computing device or at a single physical location.

Figure 7:
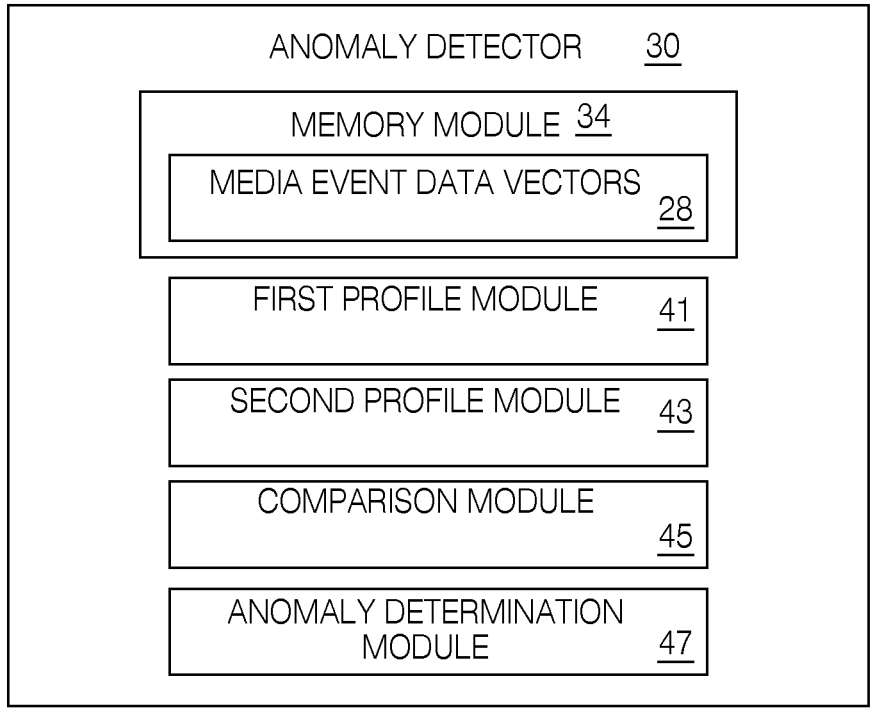
FIG. 7 is a block diagram of an alternative anomaly detector which may be implemented as a computer program stored in non-transitory media.

FIG. 7 is a block diagram of an alternative embodiment of the anomaly detector 30 that includes a memory module 34 and modules that may have software instructions executable by a processor. Thus, the anomaly detector of FIG. 7 may be a computer program or computer program product. The memory module 34 is configured to store media event data vectors 28. A first profile module 41 is configured to obtain a first profile of media event data. The second profile module 43 is configured to obtain a second profile of media event data. The comparison module 45 is configured to implement the cosine similarity function or other scalar vector comparison that indicates a degree of similarity or proportionality of the normal (first) vector and the target (second) vector. Based on the results of the comparison, the anomaly determination module 47 determines the presence or absence of at least one anomaly.

Figure 8:
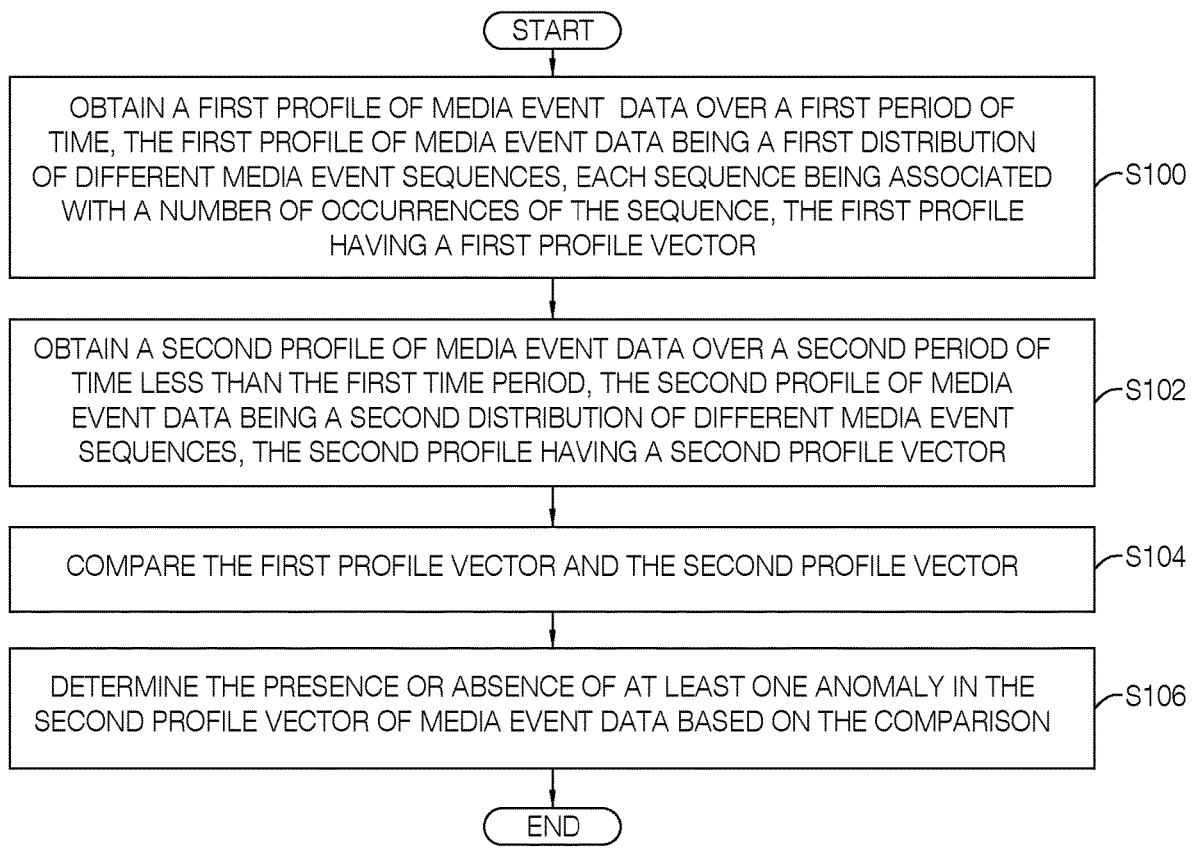
FIG. 8 is a flowchart of an exemplary process for detecting anomalies among media event sequences.

FIG. 8 is a flowchart of an exemplary process for detecting anomalies among media event sequences. The process includes obtaining a first profile of media event data over a first time period, the first profile of media event data being a first distribution of different media event sequences, each sequence being associated with a number of occurrences of the sequence, the first profile having a first profile vector (block S100). The process also includes obtaining a second profile of media event data over a second time period less than the first time period, the second profile of media event data being a second distribution of the different media sequences, the second profile having a second profile vector (block S102). The process steps of blocks S100 and S102 may be performed by the profile determiner 40. The process also includes comparing the first profile vector and the second profile vector (block S104). This process step may be performed by the comparator 42. The process further includes determining one of a presence and absence of at least one anomaly in the second profile vector of media event data based on the comparison (block S106). This process step may be performed manually or automatically via the anomaly determiner 44.

Embodiments described herein enable detection of anomalies and system events not detectable by a conventional KPI time series analysis. The anomaly detector described herein can detect abnormal changes such as changes in network quality, change of user behavior, upgrade of applications, system errors, and other events and anomalies. The solution presented herein can be used by itself or as a complement to the KPI time series analysis, and further enables real time monitoring of system performance.

Thus, one embodiment is a method that includes obtaining a first profile of media event data over a first time period, where the first profile of media event data is a first distribution of different media event sequences. Each sequence is associated with a number of occurrences of the sequence and the first profile having a first profile vector. The method further includes obtaining a second profile of media event data over a second time period less than the first time period. The second profile of media event data is a second distribution of the different media sequences and the second profile having a second profile vector. The method also includes comparing the first profile vector and the second profile vector, and determining one of a presence and absence of at least one anomaly in the second profile vector of media event data based on the comparison.

In some embodiments, the comparing includes computing a scalar product of the first profile vector and the second profile vector. In some embodiments, a media event of the media event data of the first profile vector includes at least one of a buffer start event, a media start event and a bit-rate switch event. In some embodiments, the first time period is at least a month and the second time period is at least an hour. In some embodiments, the comparing is by a cosine similarity function. In some embodiments, the comparing is by a cosine similarity function and the method further includes storing the cosine similarity function as a function of time of occurrence of events to determine a time of occurrence of the anomaly. In some embodiments, the method further includes comparing the function of time of the cosine similarity to a function of key performance indicators, KPIs, versus time to ascertain a cause of the anomaly. In some embodiments, an anomaly is determined to exist when the cosine similarity function drops below a predetermined threshold.

In some embodiments, an anomaly detector for detecting anomalies among media event sequences is provided. The anomaly detector 30 includes processing circuitry 32 including a memory 34 and a processor 36. The memory 34 is configured to store a first vector of media event data and a second vector of media event data. The processor 36 is configured to: obtain a first profile of media event data over a first time period, the first profile of media event data being a first distribution of different media event sequences, each sequence being associated with a number of occurrences of the sequence, the first profile having a first profile vector. The processor 36 is also configured to: obtain a second profile of media event data over a second time period less than the first time period, the second profile of media event data being a second distribution of the different media sequences, the second profile having a second profile vector. The processor 36 is also configured to compare the first profile vector and the second profile vector, and determine one of a presence and absence of at least one anomaly in the second profile of media event data based on the comparison.

In some embodiments, the comparing includes computing a scalar product of the first profile vector and the second profile vector. In some embodiments, a media event of the media event data of the first profile vector includes at least one of a buffer start event, a media start evet and a bit-rate switch event. In some embodiments, the first time period is at least a month and the second time period is at least an hour. In some embodiments, the comparing is by a cosine similarity function. In some embodiments, the comparing is by a cosine similarity function and the method further includes storing the cosine similarity function as a function of time of occurrence of events to determine a time of occurrence of the anomaly. In some embodiments, the method further includes comparing the function of time of the cosine similarity to a function of key performance indicators, KPIs, versus time to ascertain a cause of the anomaly.

In some embodiments, an anomaly is determined to exist when the cosine similarity computation drops below a predetermined threshold.

One embodiment is an anomaly detector for detecting anomalies among media event sequences. A first profile module 41 is configured to obtain a first profile of media event data over a first time period. The first profile of media event data is a first distribution of different media event sequences, each sequence being associated with a number of occurrences of the sequence. The first profile has a first profile vector. A second profile module 43 is configured to obtain a second profile of media event data over a second time period less than the first time period. The second profile of media event data is a second distribution of the different media sequences and the second profile has a second profile vector. A comparison module 45 is configured to compare the first profile vector and the second profile vector; and an anomaly determination module is configured to determine one of a presence and absence of at least one anomaly in the second profile vector of media event data based on the comparison.

In some embodiments, the comparing includes computing a scalar product of the first profile vector and the second profile vector. In some embodiments, the scalar product is a cosine similarity function and the memory 34 is further configured to store the cosine similarity function as a function of time of occurrence of events to determine a time of occurrence of the anomaly. In some embodiments, a root cause determiner is configured to compare the function of time of the cosine similarity function to a function of key performance indicators, KPIs, versus time to ascertain a cause of the anomaly.

One embodiment is a computer program product stored on a non-transitory medium. The computer program product is for detecting anomalies among media event sequences. The computer program product has instructions that when executed by a processor cause the processor to perform the process steps of obtain a first profile of media event data over a first time period, obtain a second profile of media event data over a second time period less than the first time period, compare the first profile vector and the second profile vector, and determine one of a presence and absence of at least one anomaly in the second profile vector of media event data based on the comparison.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, (thereby creating a special purpose computer) special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method of detecting anomalies among media event sequences, the method comprising:
    obtaining a first profile of media event data over a first time period, the first profile of media event data being a first distribution of different media event sequences, each sequence being associated with a number of occurrences of the sequence, the first profile having a first profile vector;
    obtaining a second profile of media event data over a second time period less than the first time period, the second profile of media event data being a second distribution of the different media sequences, the second profile having a second profile vector;
    comparing the first profile vector and the second profile vector, the comparing using a cosine similarity function, the cosine similarity function including computing a division of a scalar product of the first profile vector and the second profile vector by a magnitude product of the first profile vector and the second profile vector; and
    determining one of a presence and absence of at least one anomaly in the second profile vector of media event data based on the comparison.

2. The method of claim 1, wherein a media event of the media event data of the first profile vector includes at least one of a buffer start event, a media start event and a bit-rate switch event.

3. The method of claim 1, wherein the first time period is at least a month and the second time period is at least an hour.

4. The method of claim 1, wherein the comparing is by a cosine similarity function and the method further includes storing the cosine similarity function as a function of time of occurrence of events to determine a time of occurrence of the anomaly.

5. The method of claim 4, further comprising comparing the function of time of the cosine similarity function to a function of key performance indicators, KPIs, versus time to ascertain a cause of the anomaly.

6. The method of claim 1, wherein an anomaly is determined to exist when the cosine similarity function drops below a predetermined threshold.

7. An anomaly detector for detecting anomalies among media event sequences, the anomaly detector comprising:
    processing circuitry including a memory and a processor;
    the memory configured to store a first vector of media event data and a second vector of media event data;
    the processor configured to:

obtain a first profile of media event data over a first time period, the first profile of media event data being a first distribution of different media event sequences, each sequence being associated with a number of occurrences of the sequence, the first profile having a first profile vector;

obtain a second profile of media event data over a second time period less than the first time period, the second profile of media event data being a second distribution of the different media sequences, the second profile having a second profile vector;

compare the first profile vector and the second profile vector, the comparing using a cosine similarity function, the cosine similarity function including computing a division of a scalar product of the first profile vector and the second profile vector by a magnitude product of the first profile vector and the second profile vector; and determine one of a presence and absence of at least one anomaly in the second profile of media event data based on the comparison.

8. The anomaly detector of claim 7, wherein a media event of the media event data of the first profile vector includes at least one of a buffer start event, a media start evet and a bit-rate switch event.

9. The anomaly detector of claim 7, wherein the first time period is at least a month and the second time period is at least an hour.

10. The anomaly detector of claim 7, wherein the memory is further configured to store the cosine similarity function as a function of time of occurrence of events to determine a time of occurrence of the anomaly.

11. The anomaly detector of claim 10, wherein the processor is further configured to compare the function of time of the cosine similarity function to a function of key performance indicators, KPIs, versus time to ascertain a cause of the anomaly.

12. The anomaly detector of claim 7, wherein an anomaly is determined to exist when the cosine similarity function drops below a predetermined threshold.

* * * * *